(12) United States Patent
Sun et al.

(10) Patent No.: US 11,877,245 B2
(45) Date of Patent: Jan. 16, 2024

(54) APPARATUS, SYSTEM, AND METHOD FOR ENHANCED MOBILE STATION POWER TRANSMISSION

(71) Applicant: Apple Inc., Cupertino, CA (US)

(72) Inventors: Haitong Sun, Irvine, CA (US); Wei Zhang, Santa Clara, CA (US); Tianyan Pu, Cupertino, CA (US); Pengkai Zhao, San Jose, CA (US); Jia Tang, San Jose, CA (US); Yushu Zhang, Beijing (CN); Yuchul Kim, Santa Clara, CA (US); Hong He, Cupertino, CA (US); Dawei Zhang, Saratoga, CA (US); Wei Zeng, San Diego, CA (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 16/976,322

(22) PCT Filed: Nov. 28, 2019

(86) PCT No.: PCT/CN2019/121563
§ 371 (c)(1),
(2) Date: Aug. 27, 2020

(87) PCT Pub. No.: WO2021/102788
PCT Pub. Date: Jun. 3, 2021

(65) Prior Publication Data
US 2022/0264471 A1    Aug. 18, 2022

(51) Int. Cl.
*H04W 52/14* (2009.01)
*H04L 5/00* (2006.01)
*H04W 52/36* (2009.01)

(52) U.S. Cl.
CPC ......... *H04W 52/146* (2013.01); *H04L 5/0051* (2013.01); *H04W 52/365* (2013.01); *H04W 52/367* (2013.01)

(58) Field of Classification Search
None
See application file for complete search history.

(56) References Cited

U.S. PATENT DOCUMENTS

| | | | |
|---|---|---|---|
| 11,101,953 B2 * | 8/2021 | Lee | H04B 7/0486 |
| 2011/0294529 A1 * | 12/2011 | Luo | H04L 5/0035 |
| | | | 455/509 |

(Continued)

FOREIGN PATENT DOCUMENTS

| | | | |
|---|---|---|---|
| CN | 109495879 A | 3/2019 | |
| CN | 110476365 A | 11/2019 | |

(Continued)

OTHER PUBLICATIONS

3GPP TSG RAN WG1 #99 Title: Full Tx Power UL transmission Date: Nov. 18-22, 2019 (Year: 2019).*

(Continued)

*Primary Examiner* — Tejis Daya
(74) *Attorney, Agent, or Firm* — Kowert, Hood, Munyon, Rankin & Goetzel, P.C.

(57) ABSTRACT

Apparatuses, systems, and methods to indicate power transmission capability for a wireless device. A wireless device may connect to a base station (BS). The wireless device may transmit information regarding transmit power capability to the BS. The wireless device may indicate support for full power transmit capability for a subset of TPMIs for which it provides full power transmit capability, e.g., in a bitmap. This subset of TPMIs may be less than all of the available TPMIs (i.e., it may be a strict subset of the available TPMIs). Full power transmission capability of these indicated TPMIs may be provided via antenna switching and/or antenna virtualization. The wireless device may perform uplink transmission to the BS according to the transmit power capability indicated in the information. For example, the UE (Continued)

may transmit data using the antenna virtualization related to the subset of the TPMIs.

20 Claims, 5 Drawing Sheets

(56) References Cited

U.S. PATENT DOCUMENTS

| | | | |
|---|---|---|---|
| 2018/0019794 A1* | 1/2018 | Kowalski | H04L 5/003 |
| 2018/0183503 A1* | 6/2018 | Rahman | H04W 72/042 |
| 2018/0227094 A1* | 8/2018 | Liu | H04W 72/046 |
| 2018/0287757 A1* | 10/2018 | Onggosanusi | H04W 72/23 |
| 2019/0103907 A1* | 4/2019 | Yang | H04B 7/063 |
| 2019/0199553 A1* | 6/2019 | Park | H04L 5/0094 |
| 2019/0207731 A1* | 7/2019 | Park | H04B 7/0639 |
| 2019/0327691 A1 | 10/2019 | Zhang et al. | |
| 2019/0327693 A1* | 10/2019 | Rahman | H04W 52/146 |
| 2020/0045644 A1* | 2/2020 | Sridharan | H04W 52/16 |
| 2020/0162133 A1* | 5/2020 | Harrison | H04B 7/0617 |
| 2020/0266867 A1* | 8/2020 | Park | H04B 7/0456 |
| 2020/0267661 A1* | 8/2020 | Park | H04W 52/146 |
| 2020/0267701 A1* | 8/2020 | Park | H04W 8/24 |
| 2020/0336998 A1* | 10/2020 | Rahman | H04B 7/0639 |
| 2021/0051608 A1* | 2/2021 | Sridharan | H04L 25/0226 |
| 2021/0258886 A1* | 8/2021 | Sun | H04W 52/42 |
| 2021/0281448 A1* | 9/2021 | Li | H04B 7/0456 |
| 2022/0217646 A1* | 7/2022 | Huang | H04W 72/0473 |
| 2022/0248431 A1* | 8/2022 | Li | H04L 5/0051 |

FOREIGN PATENT DOCUMENTS

| | | |
|---|---|---|
| EP | 3562052 A1 | 10/2019 |
| WO | 2018/231141 A1 | 12/2018 |
| WO | 2019035213 | 2/2019 |
| WO | 2019164309 A1 | 8/2019 |

OTHER PUBLICATIONS

International Search Report and Written Opinion, Application No. PCT/CN2019/121563, dated Aug. 19, 2020, 10 pages.
Huawei, Hi Silicon Enhancements on UL MIMO with multiple PAs to allow full power transmission 3GPP TSG RAN WG1 Meeting #96bis RI-1903972 Apr. 12, 2019 (Apr. 12, 2019) pp. 1-2, 4, 6.
Extended European Search Report for EP Patent Application No. 19927571.0; dated Nov. 24, 2021.
VIVO "Feature lead summary on Full TX Power UL transmission"; 3GPP TSG RAN WG1 #96bis R1-1905637; Xi'an, China; Apr. 8-12, 2019.
Office Action for Japanese Pat. Application No. 2022-529779; dated May 15, 2023.
Office Action for Japanese Pat. Application No. 2022-529779; dated Nov. 6, 2023.
"3red Generation Partnership Project; Technical Specification Group Radio Access Network; NR; User Equipment radio access capabilities"; 3GPP TS 38.306 v15.7.0; Sep. 2019.

* cited by examiner

APPARATUS, SYSTEM, AND METHOD FOR ENHANCED MOBILE STATION POWER TRANSMISSION

PRIORITY CLAIM INFORMATION

This application is a national stage application of International Application No. PCT/CN2019/121563, filed on Nov. 28, 2019, titled "Apparatus, System, and Method for Enhanced Mobile Station Power Transmission", which is hereby incorporated by reference in its entirety.

FIELD

The present application relates to wireless devices, and more particularly to apparatus, systems, and methods for a wireless device to establish and maintain concurrent connections with current radio access technologies and next generation radio access technologies.

DESCRIPTION OF THE RELATED ART

Wireless communication systems are rapidly growing in usage. Further, wireless communication technology has evolved from voice-only communications to also include the transmission of data, such as Internet and multimedia content. As a result, the circuitry and management of antennas, transmission circuitry, and power has become increasingly complex and important.

SUMMARY

Embodiments relate to apparatuses, systems, and methods to indicate power transmission capability for a wireless device.

A wireless device may connect to a base station (BS). The wireless device may transmit information regarding transmit power capability to the BS. The wireless device may indicate support for full power transmit capability for a subset of TPMIs for which it provides full power transmit capability, e.g., in a bitmap. This subset of TPMIs may be less than all of the available TPMIs (i.e., it may be a strict subset of the available TPMIs). Full power transmission capability of these indicated TPMIs may be provided via antenna switching and/or antenna virtualization.

The wireless device may perform uplink transmission to the BS according to the transmit power capability indicated in the information. For example, the UE may transmit data using the antenna virtualization related to the subset of the TPMIs.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
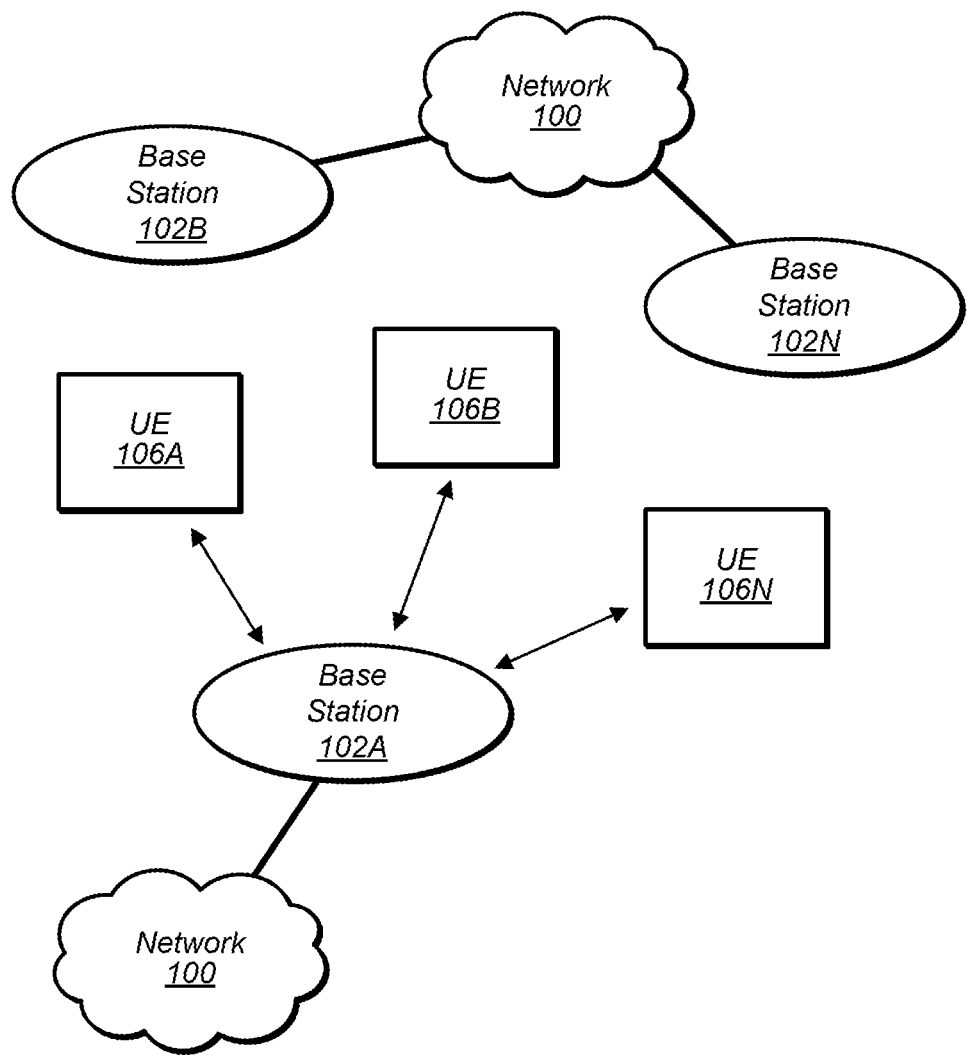
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
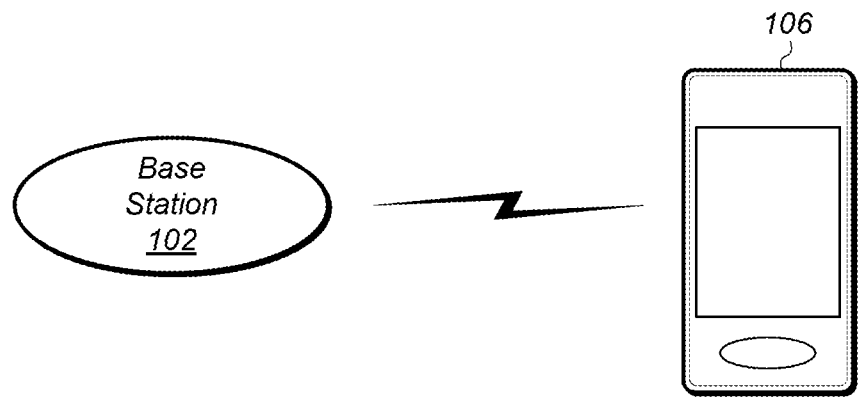
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
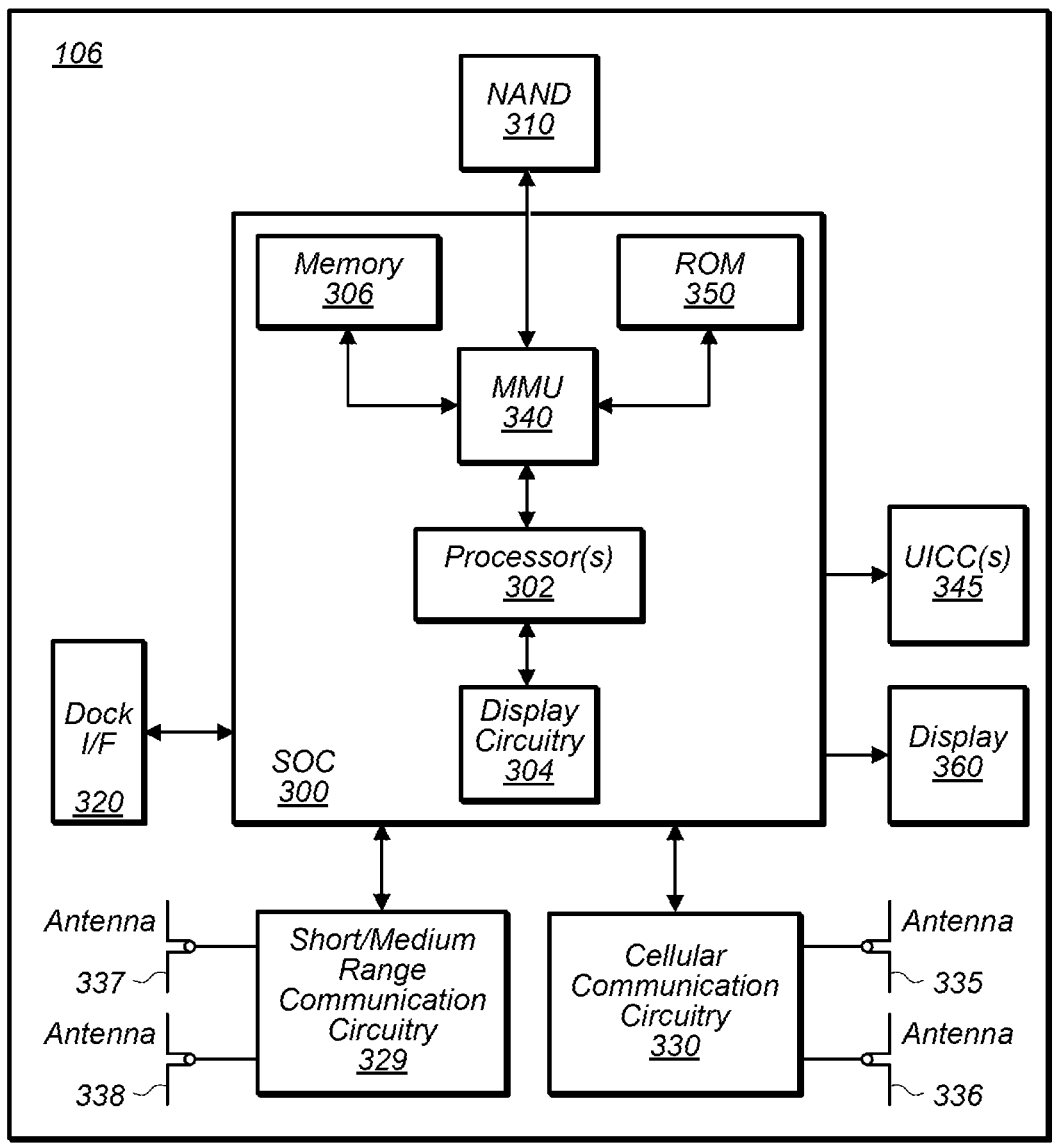
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
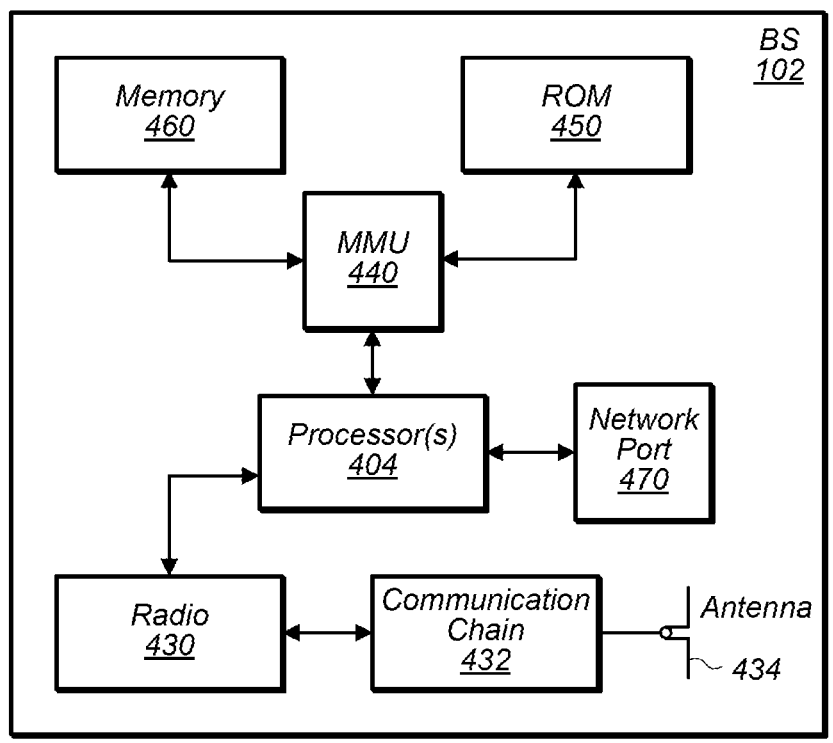
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
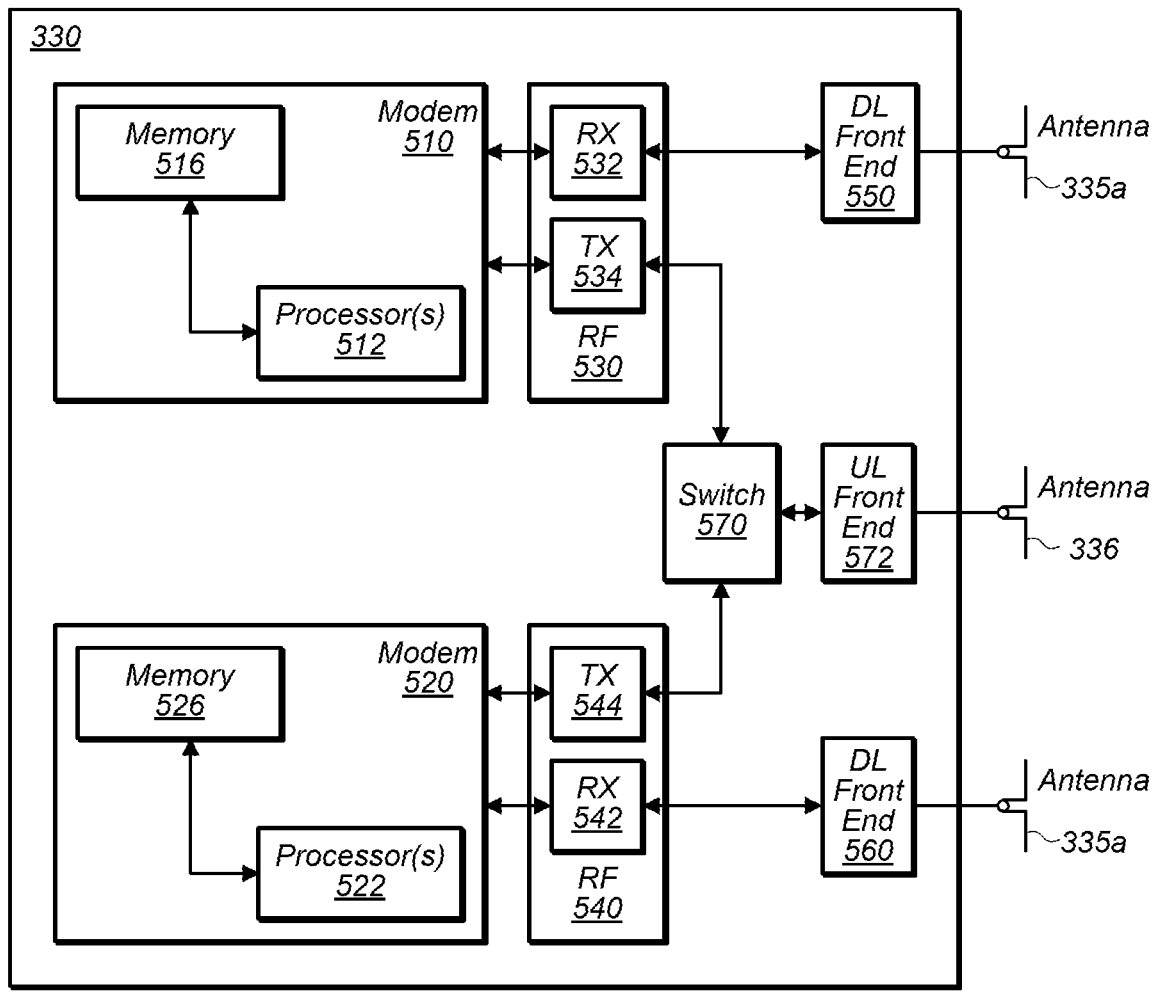
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Power Transmission

In some implementations, standards may UE transmission power. For example, NR release 15 ("Rel-15") power control design limits the UE maximum transmit power for non-full-rank transmission. In particular, regarding the PUSCH power control, Rel-15 38.213 states:

"For a PUSCH transmission on active UL BWP b, as described in subclause 12, of carrier f of serving cell c, a UE first scales a linear value 'P(i, j, q, l) of the transmit power P(i, j, q, l) with parameters as defined in subclause 7.1.1, by the ratio of the number of antenna ports with a non-zero PUSCH transmission power to the number of configured antenna ports for the PUSCH transmission scheme. The UE splits the resulting scaled power equally across the antenna ports on which the UE transmits the PUSCH with non-zero power."

As an example, for a UL precoder having 2 configured antenna ports and 1 non-zero power antenna ports, the maximum transmit power is 23−3=20 dBm.

Fundamentally, the issue is that devices may use different power amplifier ("PA") architectures. For example, with two PAs, there are three different possible architectures considering full-rate PA (23 dBm) and half-rate PA (20 dBm): two 23 dBm PAs, one 23 dBm PA and one 20 dBm PA, and two 20 dBm PAs. The possibilities multiply when considering four PAs and/or full-rate PA (23 dBm), half-rate PA (20 dBm), and quarter-rate PA (17 dBm).

In some embodiments, a UE with non-full-rate PA may still be able to support full power transmission. For example, the UE may be able to switch the PA among different antennas, although this may introduce switching latency and/or switching insertion loss. As another possibility, the UE may be able to implement antenna virtualization, e.g., using a small delay (e.g., small delay cyclic delay diversity (CDD)), and/or open loop beamforming (e.g., introducing a change in phase).

In some embodiments, the UE may be configured to signal its full power transmit capability without explicitly revealing UE hardware PA architecture. For example, the UE may be configured to indicate: whether the UE supports full power UL transmission and/or which TPMI (Transmitted Precoding Matrix Indicator) supports full power UL transmission.

However, sounding requirements, e.g., related to sounding reference signals (SRS) may involve additional configuration. For example, Rel-15 indicates that one SRS resource can sound all ports for a UE using full-coherent UL MIMO. However, when antenna virtualization is used, ports in lower ranked may be transmitted differently from ports in higher rank, which may necessitate additional SRS configuration.

Accordingly, in some embodiments, a UE may be allowed the full flexibility to signal its full power transmission capability without revealing its hardware implementation details. For example, the UE may be configured to indicate additional information than only whether or not it has full power transmit capability. In some embodiments, the UE may be allowed to provide an indication of the TPMI that it can transmit full power on (e.g., using any of a variety of methods, such as via an index indication, a bitmap, etc. However, the UE may be allowed to omit the TPMI indication (e.g., the bitmap). For example, if the UE indicates that it does not support full power transmit capability, no TPMI indication may be required. Additionally, if the UE indicates that it does support full power transmission without sending a TPMI indication, the BS/network may assume that the UE supports full power transmission on all of the TPMI.

TABLE 1 illustrates an exemplary precoding matrix for a single-layer transmission using two antenna ports:

| TPMI index | W (ordered from left to right in increasing order of TPMI index) |
|---|---|
| 0 -5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

Thus, according to this embodiment, if the UE transmits a "0" for full power transmit capability, this indicates the UE only supports full power transmission when all ports are used. If the UE transmits a "1" for full power transmit capability, without sending a TPMI indication (e.g., a bitmap), then the UE supports full power transmission of all TPMI. If the UE transmits a "1" for full power transmit capability, and sends a bitmap of "(0, 0, 1, 0, 0, 0, 0)" (among other possibilities), the UE only supports full power transmission of [1, 1]/sqrt(2) (indicating by the third value of Table 1 above, at index 2).

As noted above, the UE may also need to request a desirable SRS resource configuration in order to support antenna virtualization. In particular, in Rel-15, without antenna virtualization, the same port is used and can be sounded for both high rank transmission and lower rank transmission. However, when antenna virtualization is used, the lower rank port may use a different scheme compared to the higher rank.

Accordingly, in some embodiments, the UE may report the number of SRS resources needed and the number of ports needed for each SRS resource, and the corresponding TPMI. Additionally, in the TPMI bit map reporting, the UE may also indicate the SRS resource each TPMI would use.

For example, for two SRS resources, the UE may request the first SRS resource with one port [1 1] to support TPMI [1 1], and the second SRS resource with two ports [1 0] [0 1] to support TPMI [1 0; 0 1]

Following the prior example where the UE transmits a bitmap of (0, 0, 1, 0, 0, 0, 0) and is a non-coherent or partial coherent UE (and thus does not support TPMI 2 in Rel-15), the BS/network may normally configure a single SRS resource with two ports, since this is a two port UL. Because the UE tries to support full power transmission using TPMI 2 as a special port for antenna virtualization, the UE may prefer another SRS resource with only one port. Accordingly, the UE may request, in addition to the existing SRS resource "SRS resource 1, single port". The UE may also need to link the newly requested SRS resource to the TPMI that it supports (e.g., TPMI 2 in this case). As one example of such signaling, the UE may transmit an indication such as:

"Map TPMI=2 to SRS resource 1, single port" or "{-, -, 1, -, -, -}" telling the BS SRS resource 1 is preferred for TPMI=2.

In some embodiments, one way to support full power transmission with antenna virtualization is to use a common precoder, e.g., [1 1]. For partial-coherent and non-coherent devices, the device cannot ensure the phase coherence of the transmission. Additionally, without separate SRS sounding, power control and link adaptation loop may need to be independently adjusted. Accordingly, for the TMPI that achieve full power transmission using antenna virtualization without SRS sounding, independent power control loop may be maintained. For example, independent closed loop TPC accumulation and/or independent open loop adjustment may be performed. As a result, the BS may maintain separate link adaptation for TMPI that cannot be sounded via SRS, including the link quality estimation, MCS selection, and/or out-loop margin adjustment.

One way to support full power transmission is to use PA antenna switching. Accordingly, when PA antenna switching is used at the UE to support full power transmission, the UE may inform the base station about the special switching time needed for the PA to perform the switching. Accordingly, when the base station schedules a new port that requires PA antenna switching, the base station may provide enough offset time for the UE to perform the switch. Additionally, the base station may not assume that the UE can still maintain the phase continuity after the PA antenna switching.

In some embodiments, non-full-power transmission is also supported for the UE in order to allow for UE power consumption and/or complexity reduction. For example, it may be preferable for the UE to report its transmit power capability indirectly via new power headroom (PHR) reporting.

As an example, for a two half-rated PA non-coherence UL device, one SRS resource may be configured for UE to sound [1 0], [0 1] and another SRS resource may be configured for UE to sound [1 1], or SCDD. When the UE reports PHR, the UE may report assuming 23 dBm max transmit power. Additionally, the UE can also report the new PHR if [1 0] or [0 1] TPMI is used. During the PHR calculation, the UE may take into consideration the 20 dBm reduced maximum transmit power.

For each SRS resource, the UE may be able to transmit at full power for a subset of TPMIs, while transmit at non-full power for the remaining subset of TPMIs. Thus, in addition to the regular PHR reporting for the TPMIs that UE can transmit at full power, the UE may also be allowed to report the new PHR for the other subset of TPMIs that the UE cannot transmit at full power (corresponding to each SRS resource used for transmission). In such scenarios, UE can calculate and report the new PHR considering the reduced transmit power capability.

Figure 6:
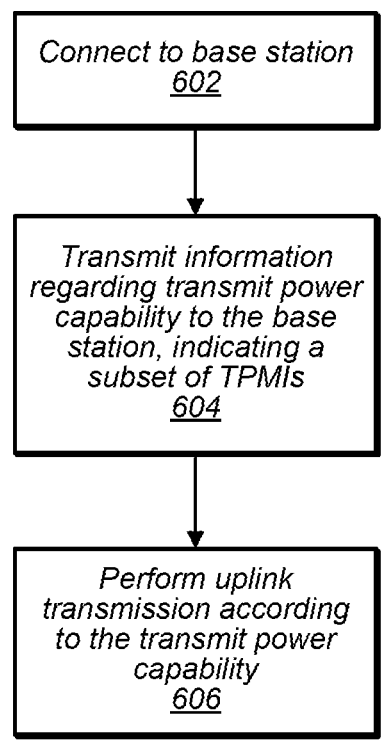
FIG. 6 is a flowchart diagram illustrating transmission power capability, according to some embodiments.

FIG. 6—Indicating Power Capability

FIG. 6 is a flowchart diagram illustrating a method for indicating power capability between a UE and a base station. Aspects of the method of FIG. 7 may be implemented by a wireless device, a base station, and/or a network, such as a UE 106, the BS 102, and/or the network 100 (e.g., a 5G AMF) illustrated in and described with respect to various of the Figures herein, or more generally in conjunction with any of the computer systems or devices shown in the above Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Similarly, one or more processors (or processing elements) of the BS may cause the BS to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 602, the UE (e.g., UE 106) may connect to the BS (e.g., BS 102). The UE and BS may perform various attachment procedures, authentication procedures, etc.

In 604, the UE may transmit information regarding transmit power capability to the BS (e.g., within an RRC message). As noted above, in some embodiments, the UE may indicate that it does not have full power transmit capability (e.g., for all TPMIs) or that it does have full power transmit capability (e.g., for all TPMIs).

In some embodiments, if the UE indicates support for full power transmit capability, it may also indicate a subset of TPMIs for which it provides full power transmit capability, e.g., in a bitmap, such as described above. This subset of TPMIs may be less than all of the available TPMIs (i.e., it may be a strict subset of the available TPMIs). As noted above, full power transmission capability of these TPMIs may be provided via antenna switching and/or antenna virtualization (generally discussed as "antenna virtualization" herein although antenna switching may still be mentioned independently).

In some embodiments, the BS may respond with a message indicating acceptance or acknowledgement of the transmit capability. The BS may also assign uplink resources based on the indication in 604. In some embodiments, the BS and UE may negotiate the uplink resources (e.g., the BS may assign resources that are different/modified from the request from the UE and notify the UE of the assigned resources).

In some embodiments, due to the use of antenna virtualization, sounding may require additional resource(s) (e.g., SRS resource(s)) and/or may be omitted. For example, the UE may transmit a request regarding sounding resources to perform sounding for the subset of TPMIs. For example, the UE may request an additional sounding resource for transmissions using antenna virtualization or antenna switching, e.g., for TPMIs associated with antenna virtualization or antenna switching. In some embodiments, the UE may indicate in the request for a sounding resource: a number of ports and/or one or more TPMIs associated with the sounding resource (e.g., using a bitmap). Thus, the UE may request a sounding resource for non-virtualized TPMIs and a separate sounding resource (or one or more additional sounding resources) for virtualized TPMIs.

Similar to above, the BS may respond to the request with one or more messages indicating acceptance or acknowledgement of the requested resources. The BS may accordingly assign sounding resources based on the request. In some embodiments, the BS and UE may negotiate the resources (e.g., the BS may assign resources that are different/modified from the request from the UE and notify the UE of the assigned resources).

In cases where additional sounding resources are used or different subsets of TPMIs corresponding to the same sounding resource support different maximum transmit power, independent power control loop and/or link adaptation may be used for each respectively (e.g., the different sounding resource or TPMI subset corresponding to the same sounding resource). The BS may indicate these independent processes and may allow for independent messaging for each different power control loop and/or link adaptation.

The UE may also transmit one or more additional power headroom indications for the subset of TPMIs. For example, the UE may adjust its power transmission scheme for the sake of power management (e.g., when the UE is conserving power consumption, such as when the battery is below a threshold) and/or transmission complexity. The BS may send a message accepting or acknowledging the indicated PHR.

In 606, the UE may perform uplink transmission to the BS according to the transmit power capability indicated in the information. For example, the UE may transmit data according to the power transmission capability indicated in 604, e.g., using the antenna virtualization related to the subset of the TPMIs.

Exemplary Embodiments

In some embodiments, a device may include: an antenna; a radio coupled to the antenna; and a processing element coupled to the radio; and may be configured to implement any embodiments described herein.

In some embodiments, a memory medium comprising program instructions that, when executed, cause a device to implement any embodiments described herein.

In some embodiments, an apparatus, comprising: a memory; and at least one processor in communication with the memory may be configured to implement any embodiments described herein In some embodiments, a method may include any action or combination of actions as substantially described herein in the Detailed Description and claims.

In some embodiments, a method may include any embodiments as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device may be configured to perform any action or combination of actions as substantially described herein in the Detailed Description, Figures, and/or claims.

In some embodiments, a wireless device may include any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit may be configured to perform any action or combination of actions as substantially described herein in the Detailed Description and/or Figures.

In some embodiments, a mobile station may be configured to perform any action or combination of actions as substantially described herein in the Detailed Description and/or Figures.

In some embodiments, a mobile station may include any component or combination of components as described herein in the Detailed Description and/or Figures as included in a mobile station.

In some embodiments, a mobile device may be configured to perform any action or combination of actions as substantially described herein in the Detailed Description and/or Figures.

In some embodiments, a mobile device may include any component or combination of components as described herein in the Detailed Description and/or Figures as included in a mobile device.

In some embodiments, a network node may be configured to perform any action or combination of actions as substantially described herein in the Detailed Description and/or Figures.

In some embodiments, a network node may include any component or combination of components as described herein in the Detailed Description and/or Figures as included in a mobile device.

In some embodiments, a base station may be configured to perform any action or combination of actions as substantially described herein in the Detailed Description and/or Figures.

In some embodiments, a base station may include any component or combination of components as described herein in the Detailed Description and/or Figures as included in a mobile device.

In some embodiments, a 5G NR network node or base station may be configured to perform any action or combination of actions as substantially described herein in the Detailed Description and/or Figures.

In some embodiments, a 5G NR network node or base station may include any component or combination of components as described herein in the Detailed Description and/or Figures as included in a mobile device.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method, comprising:
   by a user equipment device (UE):
   connecting to a base station (BS);
   transmitting information regarding transmit power capability to the BS, wherein the information includes an indication of full power transmission capability, wherein when the information further includes a bitmap, the bitmap indicates which transmitted precoding matrix indicators (TPMIs) of a set of TPMIs are supported for full power, and wherein when the information omits the bitmap, the omission of the bitmap indicates full power support for all TPMIs in the set of TPMIs; and
   transmitting data to the BS according to the transmit power capability indicated in the information.

2. The method of claim 1, wherein the information includes an indication of full power transmission support and the bitmap.

3. The method of claim 1, further comprising:
   transmitting a request regarding sounding reference signal (SRS) resources related to the subset of the TPMIs.

4. The method of claim 3, wherein the request indicates at least one additional SRS resource.

5. The method of claim 3, wherein the request includes, for each requested SRS resource:
   a number of ports; and
   one or more TPMIs.

6. The method of claim 5, wherein the one or more TPMIs are indicated using one or more references to an index.

7. The method of claim 1, further comprising:
   transmitting an additional power headroom (PHR) indication for the subset of TPMIs.

8. The method of claim 1, wherein the information omits the bitmap.

9. An apparatus, comprising:
   a processor, configured to cause a user equipment device (UE) to:
   connect to a base station (BS);
   transmit information regarding transmit power capability to the BS, wherein the information includes an indication of full power transmission capability, wherein when the information further includes a bitmap, the bitmap indicates which transmitted precoding matrix indicators (TPMIs) of a set of TPMIs are supported for full power, and wherein when the information omits the bitmap, the omission of the bitmap indicates full power support for all TPMIs in the set of TPMIs; and
   transmit data to the BS according to the transmit power capability indicated in the information.

10. The apparatus of claim 9, wherein the processor is further configured to cause the UE to:
    transmit a request regarding sounding reference signal (SRS) resources related to the subset of the TPMIs.

11. The apparatus of claim 10, wherein the request indicates at least one additional SRS resource.

12. The apparatus of claim 10, wherein the request includes, for each requested SRS resource:
    a number of ports; and
    one or more TPMIs.

13. The apparatus of claim 12, wherein the information omits the bitmap.

14. The apparatus of claim 9, wherein the processor is further configured to cause the UE to:
    transmit an additional power headroom (PHR) indication for the subset of TPMIs.

15. A user equipment device (UE), comprising:
    one or more antennas;
    a processor coupled to the one or more antennas, wherein the processor is configured to cause the UE to:
    connect to a base station (BS);
    transmit information regarding transmit power capability to the BS, wherein the information includes an indication of full power transmission capability, wherein when the information further includes a bitmap, the bitmap indicates which transmitted precoding matrix indicators (TPMIs) of a set of TPMIs are supported for full power, and wherein when the information omits the bitmap, the omission of the bitmap indicates full power support for all TPMIs in the set of TPMIs; and
    transmit data to the BS according to the transmit power capability indicated in the information.

16. The UE of claim 15, wherein the processor is further configured to cause the UE to:
    transmit a request regarding sounding reference signal (SRS) resources related to the subset of the TPMIs.

17. The UE of claim 16, wherein the request indicates at least one additional SRS resource.

18. The UE of claim 16, wherein the request includes, for each requested SRS resource:
    a number of ports; and
    one or more TPMIs.

19. The UE of claim 18, wherein the information omits the bitmap.

20. The UE of claim 15, wherein the processor is further configured to cause the UE to:
    transmit an additional power headroom (PHR) indication for the subset of TPMIs.

* * * * *